United States Patent [19]

Cameron et al.

[11] 4,002,238
[45] Jan. 11, 1977

[54] MAGNETIC TAPE CARTRIDGE WITH REMOVABLE SPOOL

[75] Inventors: Douglas H. Cameron, Stillwater; Bryan M. Clem, Minneapolis, both of Minn.

[73] Assignee: Minnesota Mining and Manufacturing Co., St. Paul, Minn.

[22] Filed: Nov. 21, 1975

[21] Appl. No.: 634,287

Related U.S. Application Data

[63] Continuation-in-part of Ser. No. 542,025, Jan. 17, 1975, abandoned.

[52] U.S. Cl. .............................. 206/408; 206/416; 242/55.53; 242/71.1; 312/37
[51] Int. Cl.² .................. B65D 85/67; B65H 19/00
[58] Field of Search ............ 206/387, 397, 54, 408, 206/416, 407; 242/55.2, 55.53, 71.1; 312/37, 38

[56] References Cited
UNITED STATES PATENTS

| 948,490 | 2/1910 | Woodman | 206/54 |
| 1,989,053 | 1/1935 | Hills et al. | 206/407 |
| 2,380,644 | 7/1945 | Grondona | 206/408 |
| 2,546,820 | 3/1951 | Grant | 242/55.53 |
| 2,555,885 | 6/1951 | Hope | 242/55.53 |
| 2,719,679 | 10/1955 | Nerwin et al. | 242/71.1 |
| 2,905,404 | 9/1959 | Simmons | 242/55.2 |
| 3,156,425 | 11/1964 | Mynchenberg | 242/55.53 |
| 3,464,568 | 9/1969 | Hexter | 242/55.53 |
| 3,631,791 | 1/1972 | Rinkleib | 206/408 |

FOREIGN PATENTS OR APPLICATIONS 584,780  10/1969  Canada .............................. 206/408

*Primary Examiner*—Stephen P. Garbe
*Assistant Examiner*—Bruce H. Bernstein
*Attorney, Agent, or Firm*—Alexander, Sell, Steldt & DeLaHunt

[57] ABSTRACT

A tape cartridge for semi-permanently housing a removable tape spool rotatably supported in the cartridge by a pair of spring biased dowels that serve as axles for the spool and are associated with and held by a pair of collars that fit in apertures in the end walls of the cartridge.

7 Claims, 6 Drawing Figures

U.S. Patent  Jan. 11, 1977  Sheet 1 of 2  4,002,238
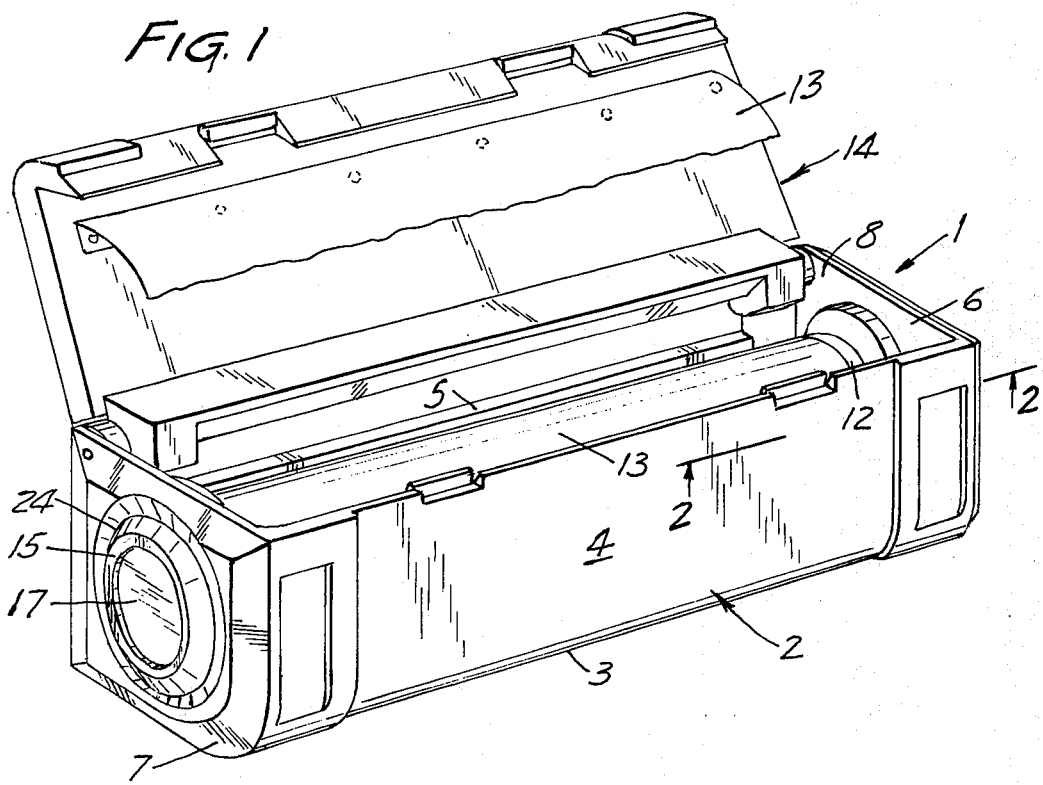
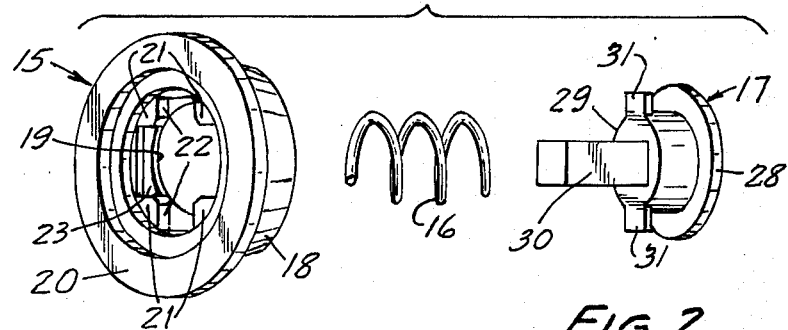
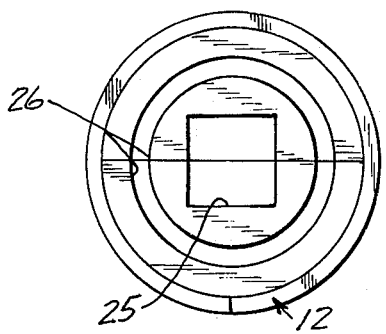
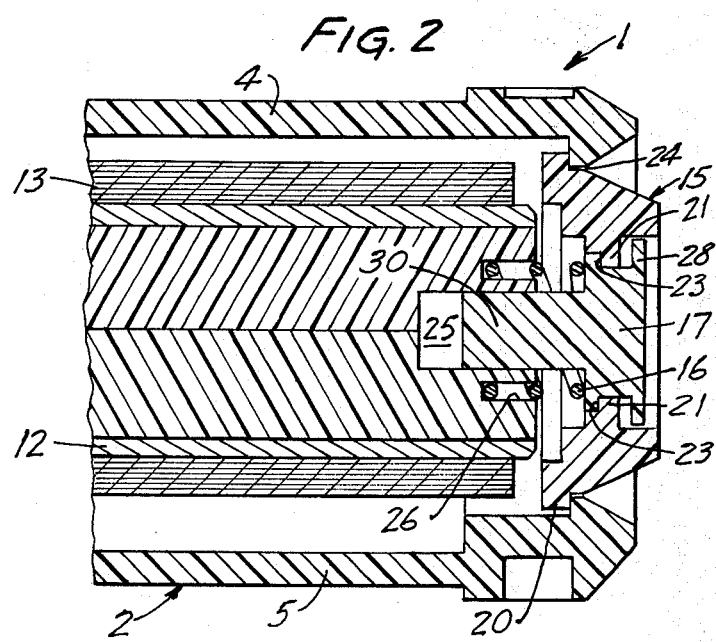

MAGNETIC TAPE CARTRIDGE WITH REMOVABLE SPOOL

CROSS-REFERENCE

This application is a continuation-in-part of application Ser. No. 542,025, filed Jan. 17, 1975 now abandoned.

BACKGROUND OF THE INVENTION

1. Field of the Invention

The present invention relates in general to a magnetic tape cartridge and more specifically to such a cartridge having a removable tape spool.

2. Description of the Prior Art

Storage devices for magnetic tape spools are known in the art for use with data processing systems. One of the more convenient devices for providing tape spool storage is the cartridge disclosed in Rinkleib U.S. Pat. No. 3,631,971. Such cartridge includes a molded housing with a hinged lid that can be opened by pressing on one of the sidewalls of the housing. A rotatable tape spool is enclosed in the housing and one end of the tape on the spool is attached to the housing lid so that when the lid is opened some of the tape is unspooled to facilitate automatic processing of the tape. The other end of the tape is fixed to the spool in such fashion that it may be detached from the spool only upon removal of the spool from the cartridge.

Although the Rinkleib cartridge has proved useful in providing a convenient means for storing tape, a deficiency of the cartridge is that the tape spool is almost impossible to remove from the housing without damaging the mechanism for holding the spool in the housing. Thus, substitution of the tape in a cartridge with a new tape is not readily accomplished, and if a tape becomes defective or obsolete, the most common recourse is to dispose of the entire cartridge. Also, it seems that precise tolerances should be maintained in the Rinkleib cartridge to properly position the spool in the cartridge. If the spool is not properly held in the cartridge, eccentric rotation of the spool may result.

SUMMARY OF THE INVENTION

The present invention provides a tape cartridge similar to that of Rinkleib except that it semi-permanently stores a rotatable tape spool by means of a pair of support devices located at opposite ends of the housing, each device including a collar that fits in an end wall aperture of the cartridge housing and a dowel that is positioned through the collar to protrude into one end of the spool to serve as an axle for the spool. Each collar has an interior flange with at least one notch and each dowel has a shoulder that must be aligned with the collar notch in order to properly assemble a dowel with a collar or to disassemble the same.

The collar and dowel of each support device can be readily assembled to securely hold the spool in the housing and can be easily disassembled to permit removal of the spool from the housing if it is desired to change magnetic tape on the spool or to insert a new spool in the cartridge. Accordingly, the present invention provides a manufacturer or user of such tape cartridges the option of merely replacing a damaged or obsolete tape with a new tape rather than junking an entire cartridge.

BRIEF DESCRIPTION OF THE DRAWINGS

FIG. 1 is a perspective view of a tape cartridge of the present invention;

FIG. 2 is an enlarged fragmentary cross sectional view taken along the plane 2—2 of FIG. 1;

FIG. 3 is an exploded view in perspective of a collar, spring and dowel included in the cartridge of FIG. 1;

FIG. 4 is an end view in elevation of a tape spool enclosed in the cartridge of FIG. 1.

DESCRIPTION OF THE PREFERRED EMBODIMENTS

Figure 5:
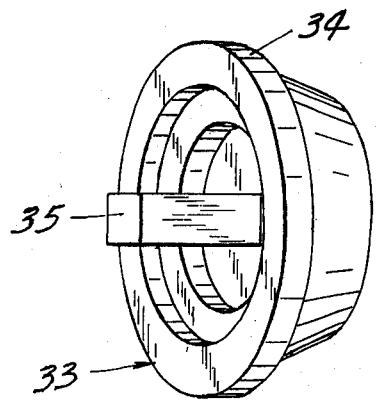
FIGS. 5 and 6 are a perspective view and a cross sectional view of a support member that may be included in the cartridge of FIG. 1.

Referring now to the drawings and initially to FIG. 1, there is shown a magnetic tape storage cartridge 1 that represents a presently preferred embodiment of the present invention. The cartridge 1 includes a housing 2 having a bottom wall 3, a pair of sidewalls 4 and 5, a pair of end walls 6 and 7 and an open top 8. Disposed in the housing 2 is a spool 12 on which a roll of magnetic tape 13 is wound.

One end of the magnetic tape 13 is attached to a lid 14 hinged at one edge to the sidewall 5. The spool 12 is rotatably held in the housing 2 so that when the lid 14 is opened, as shown in FIG. 1, a portion of the tape 13 is unspooled to facilitate automatic processing of the tape. Referring now to FIGS. 2 and 3, the spool 12 is held in the housing 2 by a support device at each end of the spool 12, each device including a collar 15, a coil spring 16 and a dowel 17.

Each collar 15 has an annular body with a substantially frusto-conical periphery. The body of each collar 15 has an exterior flange 20 formed on one end, and an interior flange 21 formed medially on its inner periphery. The flange 21 of each collar 15 is broken by two opposed notches 22, and formed in the inward facing surfaces of the flanges 21 are two opposed recessed areas 23 that lie on an axis perpendicular to an axis bisecting the notches 22. The collars 15 are sized to fit into circular apertures 24 formed in each of the housing end walls 6 and 7, but the exterior collar flanges 20 overlap the margins of said apertures 24 and prevent the collars from passing entirely therethrough.

The spool 12 is disposed in the housing 2 with its ends in alignment with the apertures 24 of the housing end walls 6 and 7. As shown in FIG. 4, each end of the spool 12 includes a central square shaped cavity 25 surrounded by an annular slot 26 in which one of the coil springs 16 is seated to protrude from the end of the spool.

Each dowel 17 has a disk-shaped head 28 at one end and a body 29 extending from one side of the head 28 and terminating in a drive lug 30. The dowel heads 28 each have a diameter greater than that of the opening defined by the collar interior flange 21 to prevent the heads 28 from passing therethrough. The drive lug 30 of each body 29 is rectangularly shaped, but near the head 28, the body 29 is cylindrically shaped. Protruding from opposite sides of the cylindrically shaped portion of the body 29 and spaced from the head 28 are a pair of shoulders 31.

Each dowel 17 is shaped so that its body 29 can be disposed through one of the collars 15, as shown in FIG. 2. To insert one of the dowels 17 into one of the collars 15, the shoulders 31 of the dowel 17 must be aligned with the notches 22 in the interior flange 21 of the collar 15 for the cylindrically shaped portion of the dowel body 29 to enter into the opening defined by the collar interior flange 21. Once inserted, the shoulders 31 prevent dowel removal when not aligned with the notches 22.

The collars 15 and the dowels 17 can readily be assembled to semi-permanently hold the spool 12 in the housing 2 in the following manner. First, the two collars 15 are positioned in the end wall apertures 24 of an empty housing 2, such that the exterior collar flanges 20 are disposed on the inside thereof. The spool 12 is placed into the housing 2 to lie between the collars 15 and the springs 16 are translated through the collar openings 19 to seat in the annular slots 26 in the ends of the spool 12. The assembly procedure is completed by inserting the dowels 17 in the collars 15 at each end of the housing 2.

Proper positioning of the dowels 17 into the collars 15 is achieved aligning the dowel shoulders 31 with the collar notches 22 and inserting the dowel bodies 29 into the collar openings 19. During such insertion, the rectangular shaped drive lugs 30 of the dowel bodies 29 first enter the open centers of the coil springs 16 seated in the ends of the spool 12, and upon further insertion move into the spool cavities 25 to serve as axles for the spool 12. The circular shaped portions of the dowel bodies 29 engage the ends of the springs 16 and further insertion of the dowels 17 compress the springs 16 until the dowel heads 28 engage the outward facing surfaces of the collar interior flanges 21. The dowels 17 are then axially rotated to move their shoulders 31 out of alignment with the collar notches 22 and into alignment with the recessed areas 23 of the inward facing surfaces of the collar interior flanges 21. The compressed springs 16 urge the dowel shoulders 31 into such recessed areas 23, with the dowel shoulders 31 engaging the collar flanges 21.

The dowels 17 are thereby firmly locked to the spool 12 and collar 15. As a result, the collars 15 and dowels 17 semi-permanently hold the spool 12 in the housing 2 until such time as it is desired to remove the spool 12. Removal of the spool 12 can readily be accomplished by reversing the foregoing procedure of assembly. Thus, the present invention provides a tape cartridge with a spool that is semi-permanently held therein, but yet can be conveniently and easily removed from the cartridge without damage to any of the cartridge components. The collars 15 not only serve as part of the support device but also align the spool 12 in the cartridge 1 during rotation of the spool 12. To rotate the spool 12 an automatic processing unit has rotating members that press both of the collars 15 inward to engage the spool 12 and in such position the spool ends are received in the collars 15 so that the spool 12 is rotated without touching the cartridge.

Figure 6:
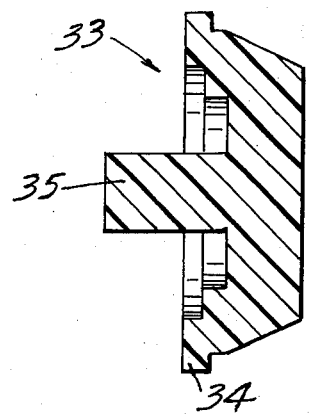

It is not essential to the present invention that each end of the cartridge 1 must employ a two piece dowel and collar construction as described above. As an alternative, one end of the spool may be supported in the cartridge by means of a unitary support member 33, as shown in FIGS. 5 and 6. The support member 33 has the same annular body exterior construction as the collar 15 and includes an exterior flange 34 formed on one end. However, the interior construction of the member 33 differs from the construction of the collar 15 in that the member 33 has a solid center portion from which a rectangularly shaped finger 35 extends. Essentially, the member 33 is formed by merging one of the dowels 17 with one of the collars 15 in the form of a unitary construction.

Because the member 33 does not have a movable dowel 17, assembly of a cartridge 1 with the use of the member 33 differs somewhat from the procedure outlined above and will now be described. First, the member 33 is positioned in one of the end wall apertures 24 of an empty housing 2 with its flange 34 disposed on the inside thereof. One of the springs 16 is then seated in the annular slot of one of the spool ends. Thereafter, the spool 12 is positioned into the housing 2 so that the finger 35 of the support member 33 is inserted into the spool cavity 25 of the spool end with the spring 16. Pressure is then applied to the opposite end of the spool 12 to compress the seated spring 16. While the seated spring 16 is under compression, one of the collars 15 is placed in the end wall aperture 24 near such opposite spool end. From this point on, assembly is the same as previously described for inserting the second spring 16 and dowel 17 in such opposite spool end to complete the assembly. Accordingly, the use of the support member 33 eliminates the need for a two piece support at each end of the spool 12 to provide a simplified construction as well as one that can be rapidly assembled.

What is claimed is:

1. In a tape cartridge including a rotatable tape spool enclosed in a housing having a bottom wall, a pair of sidewalls, a pair of end walls each with an aperture opening into said housing and aligned with the ends of said spool, and an open top closed by a cover hinged to one of said sidewalls, wherein said tape spool has a cavity formed in each end and is removably held in the housing by support devices at each end of the housing, said support devices including a collar and a dowel adapted to rotate with said spool and means spring biasing said dowel in a direction away from said spool, whereby:

each collar has an interior flange formed with at least one notch and an exterior flange that is normally seated in said housing end wall aperture; and each dowel has a head greater in diameter than the opening defined by the interior flange of the collar, a body that extends from one side of said head and terminates in a drive lug that conforms with the cavities in the ends of the spool, and an intermediate shoulder to impede insertion and removal of the body through said opening unless said shoulder is aligned with said notch.

2. A tape cartridge as recited in claim 1 wherein said collars have substantially annular configurations and the end wall apertures of said housing are substantially circular.

3. A tape cartridge as recited in claim 1 wherein the shoulders of said dowels engage the inward facing surfaces of the interior flanges of said collars.

4. A tape cartridge as recited in claim 3 wherein the inward facing surfaces of the interior flanges of said collars each have at least one recessed area into which the shoulders of said dowels are disposed to prevent rotation of the dowels except in correspondence to spool rotation.

5. In a tape cartridge including a rotatable tape spool enclosed in a housing having a bottom wall, a pair of sidewalls, a pair of end walls with an aperture opening into said housing and aligned with the ends of said spool, and an open top closed by a cover hinged to one of said sidewalls, the combination comprising:

a pair of collars, each having an interior flange formed with at least one notch and an exterior flange, said collars being seated in said housing end wall apertures;

a pair of dowels, each having a head greater in diameter than the diameter of the openings defined by the interior flanges of said collars, a body that extends from one side of said head and terminates in a drive lug and an intermediate shoulder that impedes insertion and removal of the body through the central openings of the collars unless said shoulder is aligned with said notches in the interior flanges of the collars, said dowel bodies being disposed through the collars with their drive lugs fitted into conforming cavities formed in the ends of the spool to serve as axles therefor; and a pair of spring means, each disposed between the spool and one of said dowels to provide outward pressure against said dowels.

6. In a tape cartridge including a rotatable tape spool enclosed in a housing having a bottom wall, a pair of sidewalls, a pair of end walls each with an aperture opening into said housing and aligned with the ends of said spool, and an open top closed by a cover hinged to one of said sidewalls, wherein said tape spool has a cavity formed in each end and is removably held in the housing by support devices at each end of the housing, at least one of said support devices includes a collar and a dowel adapted to rotate with said spool and means spring biasing said dowel in a direction away from said spool, whereby:

each collar has an interior flange formed with at least one notch and an exterior flange that is normally seated in said housing end wall aperture; and each dowel has a head greater in diameter than the opening defined by the interior flange of the collar, a body that extends from one side of said head and terminates in a drive lug that conforms with the cavities in the ends of the spool, and an intermediate shoulder to impede insertion and removal of the body through said opening unless said shoulder is aligned with said notch.

7. In a tape cartridge as recited in claim 6 wherein one of said support devices is a unitary member having an exterior flange that is normally seated in said housing end wall aperture, and a finger that extends from one side and conforms with the cavities in the ends of the spool.

* * * * *